United States Patent [19]
Tillman et al.

[11] 3,859,653
[45] Jan. 7, 1975

[54] BOWLING LANE MECHANIC CALL SYSTEM

[75] Inventors: Herman L. Tillman, Plantation; Stephen N. Schrock, Fort Lauderdale; Gerald M. King, Plantation, all of Fla.

[73] Assignee: Herman L. Tillman, Plantation, Fla.

[22] Filed: June 22, 1973

[21] Appl. No.: 372,562

[52] U.S. Cl. .............................. 340/323, 340/213.1
[51] Int. Cl. .......................................... G08b 23/00
[58] Field of Search....... 340/323 B, 323 R, 366 CA, 340/324 A, 324 AD, 152 R, 153, 154, 213.1; 178/17.5

[56] References Cited
UNITED STATES PATENTS

| | | | |
|---|---|---|---|
| 2,978,676 | 4/1961 | Spencer | 340/154 |
| 3,345,458 | 10/1967 | Cole et al. | 178/6.8 |
| 3,413,610 | 11/1968 | Botjer et al. | 340/172.5 |
| 3,589,725 | 6/1971 | Townsend | 340/323 |
| 3,668,687 | 6/1972 | Hale | 340/324 A |
| 3,772,597 | 11/1973 | Stover | 178/17 C |

Primary Examiner—John W. Caldwell
Assistant Examiner—Richard P. Lange
Attorney, Agent, or Firm—Marvin Reich

[57] ABSTRACT

System for communication from a bowling-lane attendant to a pit mechanic for providing a plurality of visual alphanumeric displays at various positions in the pit areas corresponding to information entered by the attendant on a numeric keyboard and a set of word pushbuttons at the attendant's desk. The keyboard and pushbutton information is encoded to drive a read-only memory which addresses a random-access memory to store display data. The display data is read out in parallel, converted to serial data for transmission to the successive display positions, at each of which it is reconverted to parallel information and displayed. Acknowledge/clear controls are provided at each display to enable the mechanic to clear a display which he has seen.

6 Claims, 18 Drawing Figures

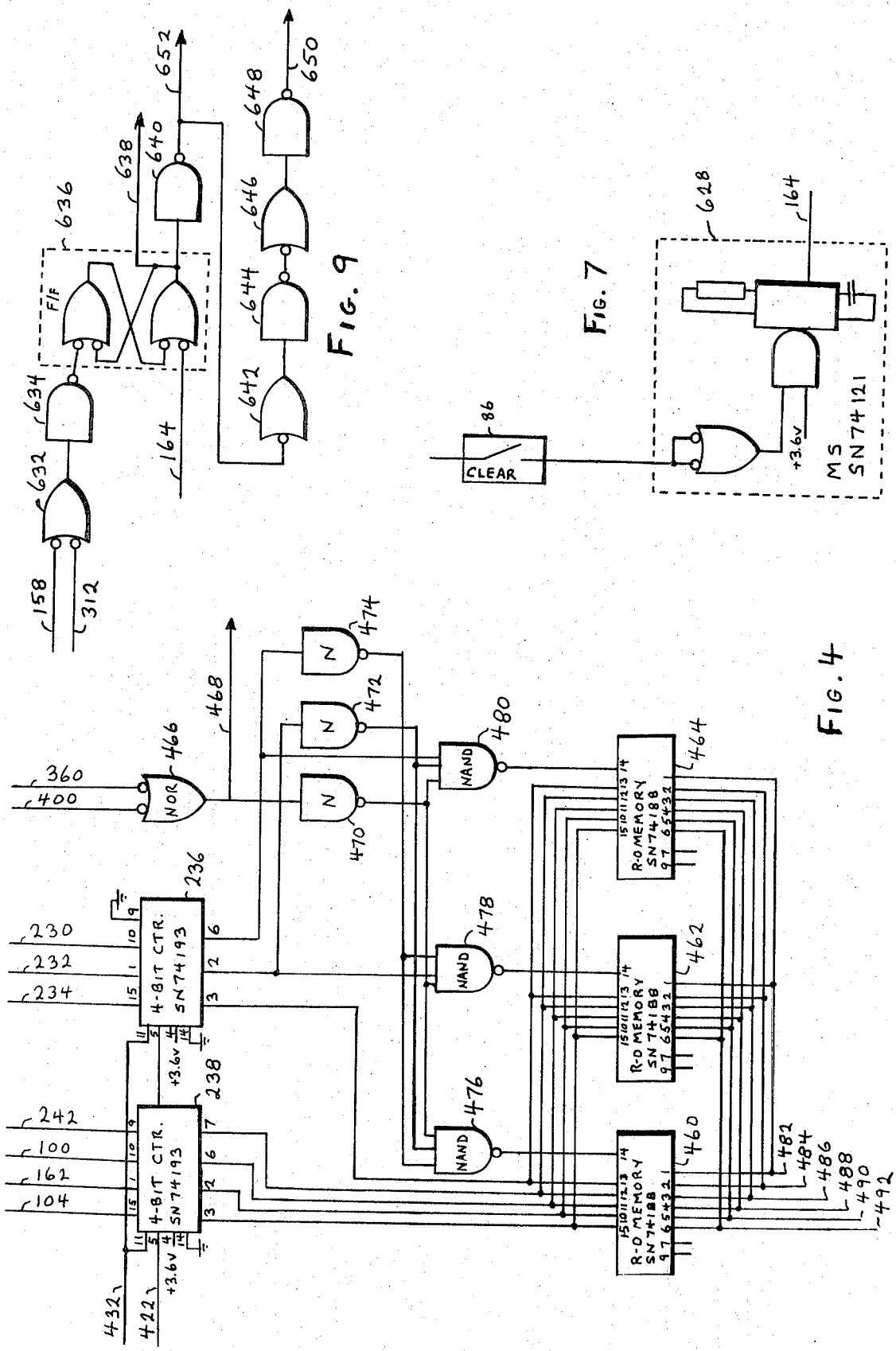

Patented Jan. 7, 1975
3,859,653
12 Sheets-Sheet 7
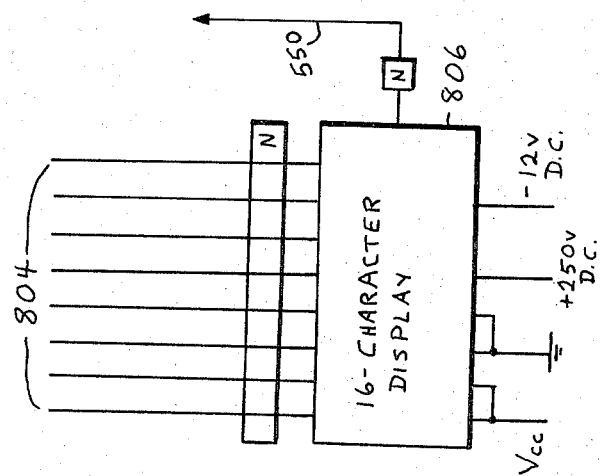
FIG. 13
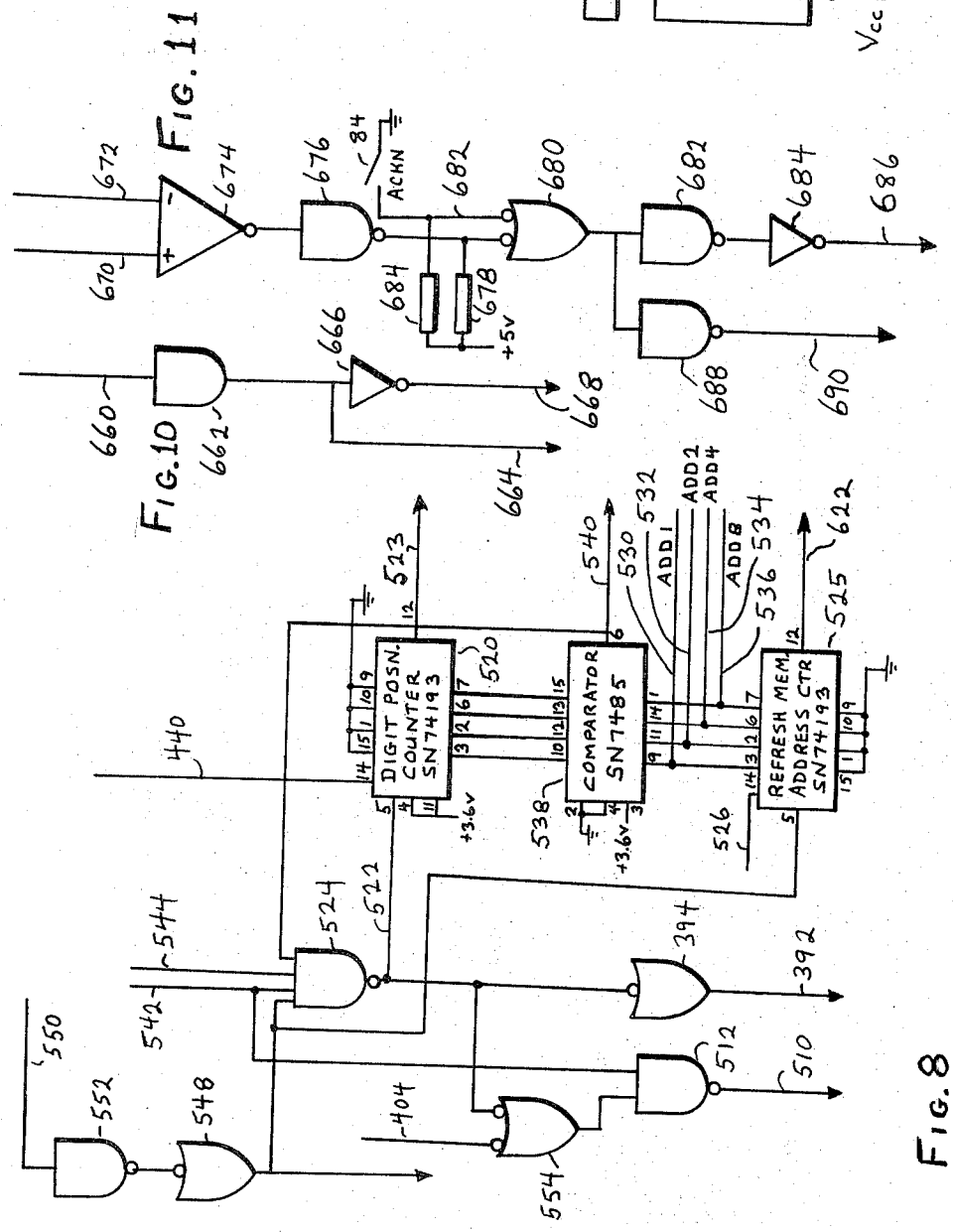
FIG. 11
FIG. 10
FIG. 8

4-BIT UP/DOWN COUNTER SN74193

BOWLING LANE MECHANIC CALL SYSTEM

BACKGROUND OF THE INVENTION

1. Field of the Invention

This invention relates to a communication system, and specifically to a system for use in a bowling lane to provide alphanumeric display of pinsetter malfunction information to mechanics in the pin-setter pits.

2. Description of the Prior Art

Previously, most bowling lanes have depended upon telephones, intercoms and public address systems for communications with pit mechanics. Because of the high level of noise associated with pinsetters, messages are frequently not understood and must be repeated several times. Answering a telephone or intercom takes the mechanic away from other tasks and requires the attendant sending the message to wait for an answer. A public address system provides no indication to the attendant that the mechanic has received the message. A teletypewriter system could be used, but would require typing skill by both the mechanic and the attendant.

SUMMARY OF THE INVENTION

The system present herein allows the attendant to press one or more buttons indicating one or more choices of number from 0–9 or blank or asterisk (*), and to press one of an available group of function pushbuttons, each of which represents a complete individual function. For example, in the embodiment presented herein, the available functions are TELEPHONE (to summon the mechanic to the phone), BALL RETURN, SPOT, RESET, CHECK, BLACKOUT, DEADWOOD (to notify the mechanic of various types of problems in a lane), and CLEAR (to clear the system memory to allow entry of new data). To enter the information on the keyboard and pushbuttons, the attendant needs no typing skill, but merely presses the appropriate button.

For example, if the attendant wishes to notify the mechanic to spot pins 5, 6, and 9 on lane 22, he would first press numeric key 2 twice, then press the pushbutton labelled SPOT, once, then press numeric keys 5, 7, and 9 in succession, thereby causing an alphanumeric display to appear at each display position reading "22 SPOT 5 7 9." Once the mechanic has read and understood the message, he depresses an Acknowledge button on the display unit, thereby clearing the message from all displays.

The displays may be duplicated at various positions in the pinsetter pits, providing display at various locations for the convenience of the mechanic. An acknowledge button can be operated at any display position.

BRIEF DESCRIPTION OF THE DRAWINGS

FIG. 4 illustrates the read-only memory and certain control logic associated therewith.

FIG. 7 illustrates the clear button for use at the attendant's desk.

FIG. 8 illustrates certain logic elements used to control the display refresh.

FIG. 9 illustrates certain signalling logic for providing a bell signal.

FIG. 10 illustrates a receiver/transmitter arrangement for relaying serial data from a previous remote display to the next display. FIG. 11 illustrates a receiver/transmitter arrangement for transmitting acknowledge signals, including local ones, to the next display position.

FIG. 13 is a block diagram of a suitable display.

DESCRIPTION OF THE PREFERRED EMBODIMENT

Figure 1:
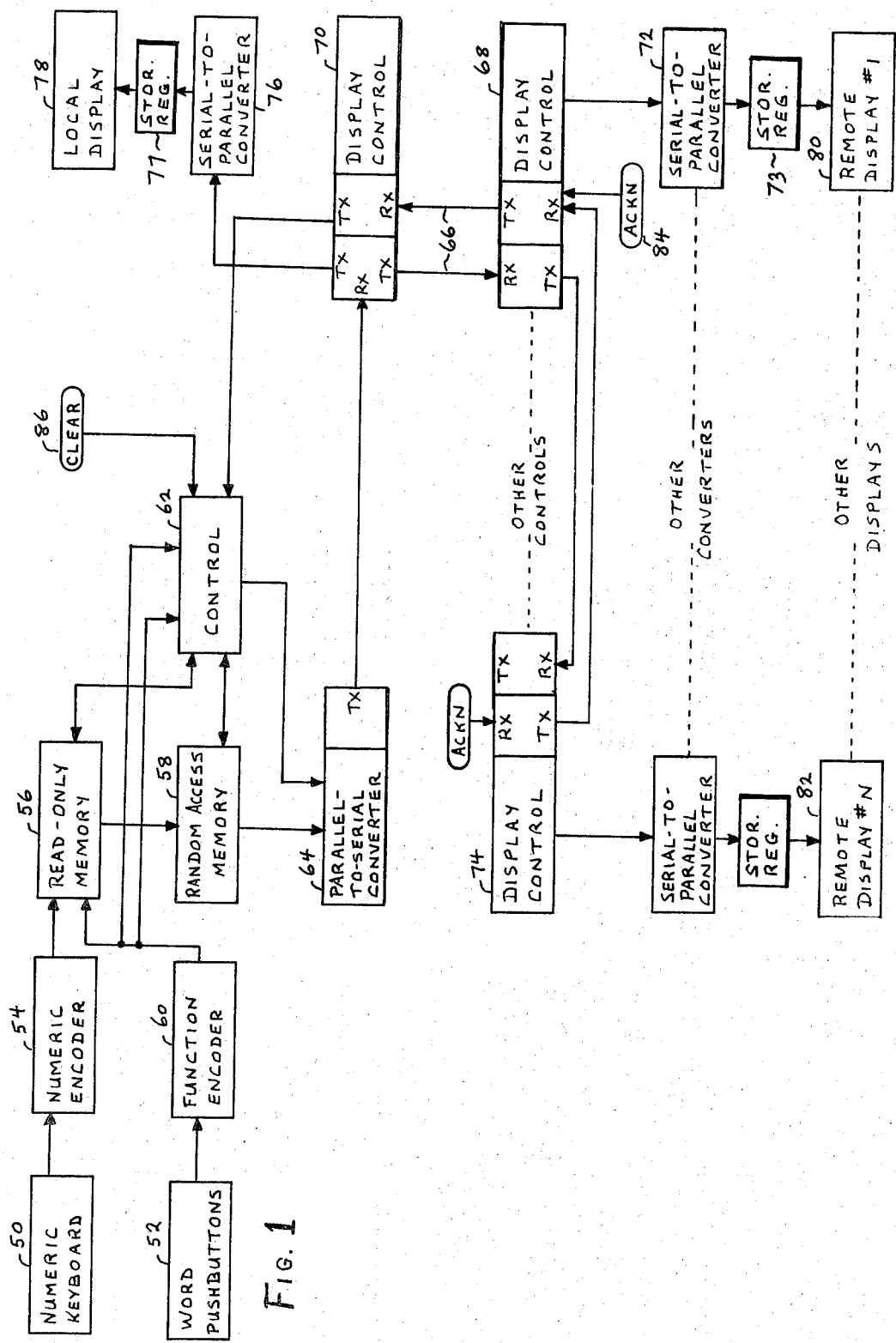
FIG. 1 is an overall block diagram of a system according to the present invention.

FIG. 1 is an overall block diagram of a preferred embodiment of the invention. A numeric keyboard 50 and a set of word pushbuttons 52 are located at the desk of the attendant who is responsible for sending a message to the pit mechanics concerning a pinsetter problem. The attendant enters the number of the problem lane on keyboard 50, then activates the appropriate one of the word pushbuttons 52 to indicate the type of malfunction, and then, if the problem is associated with particular pins, again activates the numeric keyoard to indicate the numbers corresponding to the pin location. A numeric encoder 54 encodes the signals from keyboard 50 for addressing a read-only memory (ROM) 56 to generate an appropriate display code for storage in a random-access memory (RAM) 58. A function encoder 60 similarly encodes the data from the word pushbuttons 52 to address ROM 56 to store a word-display code in RAM 58. The RAM locations correspond directly to the display character positions.

Function encoder 60 enters multicharacter data by encoding the starting address of a word message. A control unit 62 retrieves the first character of the multicharacter data from ROM 56 and transfers the resulting data from RAM 58 to a parallel-to-serial converter 64. It also causes a blank space to be inserted before and after a word when a word pushbutton is activated. The control logic 62 also periodically steps or increments the address of RAM 58 and thus transfers the contents of RAM 58 via a coaxial line 66 to a remote display control unit 68 to provide refreshed data for ultimate display. A local display control unit 70 also provides a display locally for the attendant.

The display control unit 68 decodes the serial data to provide parallel data in a serial-to-parallel converter 72 to a parallel storage register 73. It also transmits the data to the next display control unit 70, which retransmits it through the successive display controls for each remote display down the line to the final or N-th display control unit 74. The local display control unit 70 also converts the data from serial to parallel in a converter 76, stores it in a parallel storage register 77, and displays it locally on a display unit 78. A plurality of remote displays including displays 80 and 82 are provided, in any desired number for use in the desired remote locations, perhaps one in each place where the mechanic is likely to be. Each remote display includes an acknowledge button 84, with which the mechanic can signal that he has seen the display and can thereby clear the display and RAM 58. A clear button 86 is provided at the attendant's desk, which also clears the RAM 58 and allows a fresh message to be generated and displayed.

Figure 2:
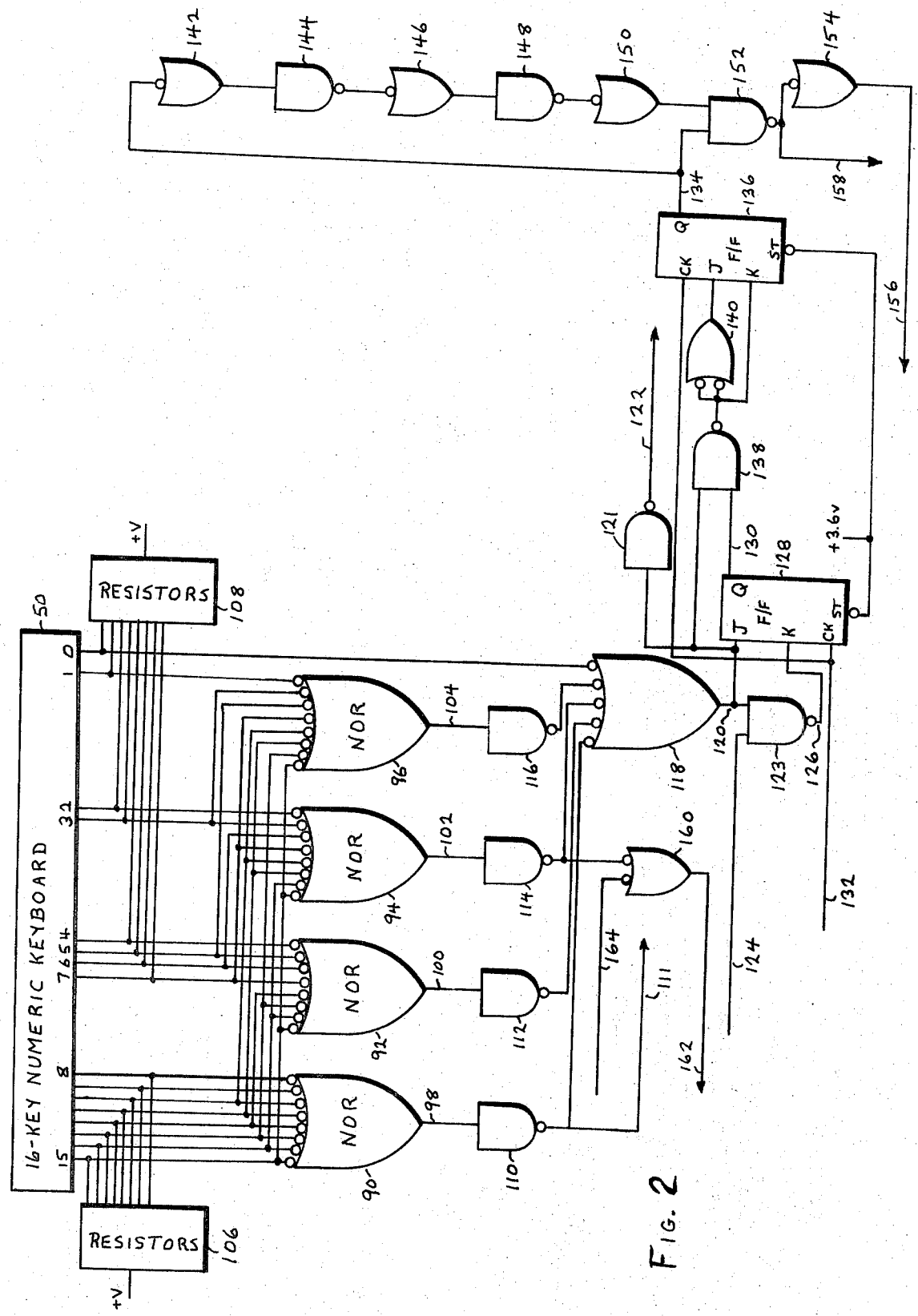
FIG. 2 is a schematic block diagram of the numeric keyboard and encoder.

FIG. 2 shows the 16-key numeric keyboard 50 connected to form NOR (NOT-OR) gates 90, 92, 94, and 96, which comprise the numeric encoder 54. If, for example, the key for number 7 were pressed, this would ground one pin each of NOR gates 92, 94, and 96, while having no effect upon NOR gate 90. Thus, the output 98 of gate 90 would remain at a zero level, while the outputs 100, 102, and 104 of gates 92, 94, and 96 would go to a ONE level. The resultant code is a binary-coded decimal (BCD) code in which a ONE on output 98 represents a value of 8, a ONE on output 100 represents 4, a ONE on output 102 represents 2, and a ONE on output 104 represents 1. In the example above, 0×8 + 1×4 + 1×2 + 1×1 equals 7, which was the key pressed. The resistors 106 and 108 are used to pull-up the gate inputs to a high or ONE level when the corresponding key is not depressed.

NAND (AND-NOT) gates 110, 112, 114 and 116 connect the BCD values from these outputs to a NOR gate 118 whose output 120 will go to ONE when any numeric key is pressed, thereby providing a key strobe signal. An inverting NOR gate 121 provides an inverted strobe signal on line 122 for any number on the keyboard. A NAND gate 123 is connected to receive the signal from output 120 and an any-function key signal on line 124 (from FIG. 3), and to provide a Zero output on line 126, provided only that it is not inhibited by a low signal on line 124 caused by a depressed function key.

The combination of a ONE on line 120 and a ZERO on line 126 causes a JK flip-flop 128 to provide a ONE signal on its output line 130 after a reset pulse on line 132 (from flip-flop 528, on line 526, FIG. 5) goes from ONE to ZERO. The occurrence of a second reset pulse on line 132 causes the output 134 of a JK flip-flop 136 to go high, thereby generating a strobe if lines 130 and 120 remain high. Flip-flop 128, NAND gate 138 and NOR gate 140 function to eliminate undesirable effects of contact bounce in keyboard 50. When output 134 does go high (to ONE), NOR 142, NAND 144, NOR 146, NAND 148, NOR 150, NAND 152 and NOR 154 combine to generate a very short high numeric strobe output pulse on line 156. A corresponding very short, but low, numeric strobe output pulse appears on line 158.

NOR gate 160 provides a high signal on line 162 to enable the loading of blank characters into the ram 58 when the clear button is pressed to place a low clear signal on line 164.

Figure 3:
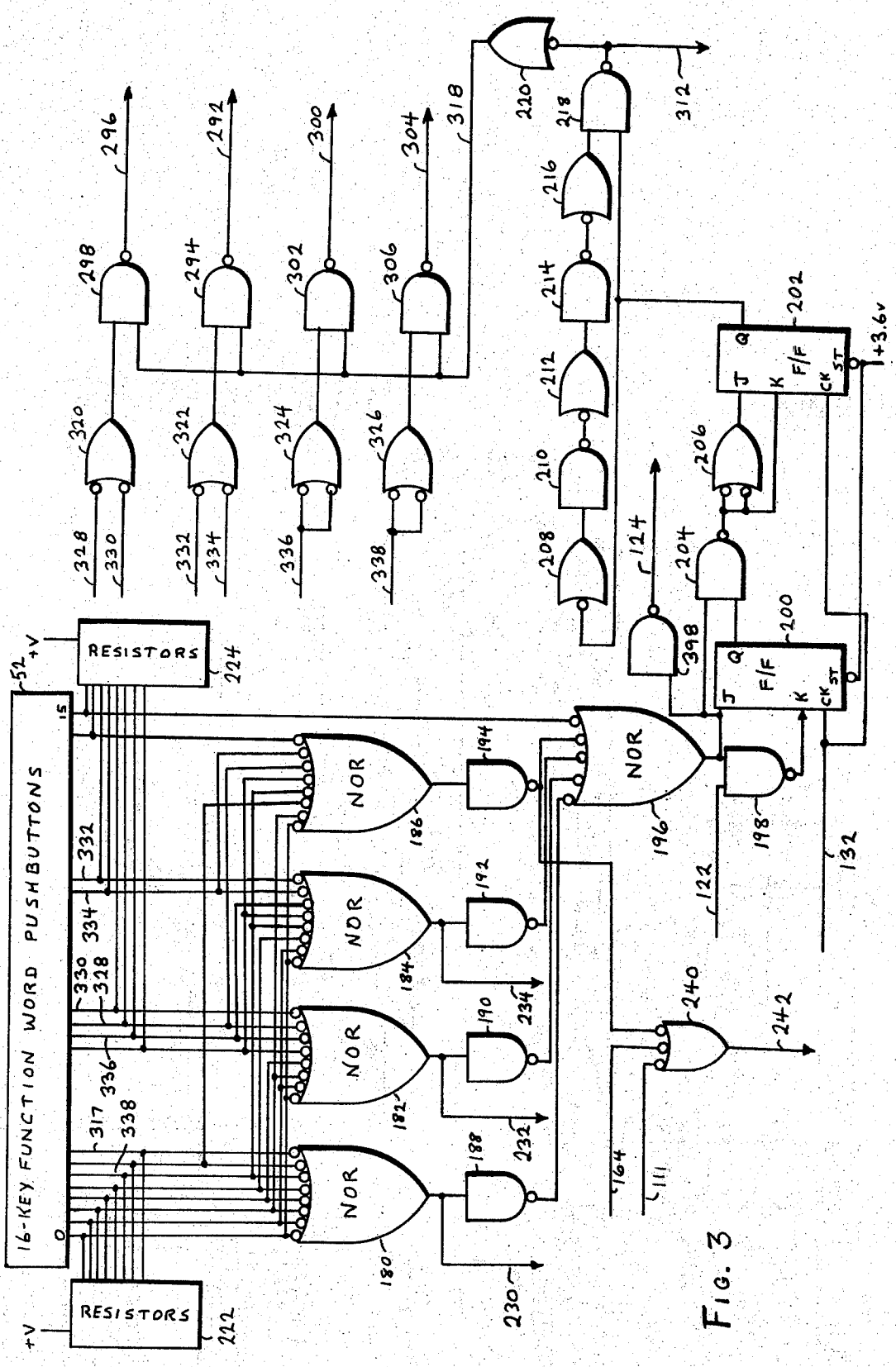
FIG. 3 is a schematic block diagram of the word pushbuttons and function encoder.

Referring now to FIG. 3, the illustrated function encoder for the word pushbuttons 52 is nearly identical in function and structure to the function encoder for the numeric keyboardr as illustrated in FIG. 2. NOR gates 180, 182, 184, and 186, NAND gates 188, 190, 192, and 194, NOR gates 196, NAND gate 198, flip-flops 200 and 202, NAND gate 204, NOR gate 206, respective NOR and NAND gates 208, 210, 212, 214, 216, 218 and 220 and resistors 222 and 224 all find their readily identifiable counterparts in the structure of FIG. 2 and function in the same manner.

Unlike the numeric encoder 54, which uses only one memory location in ROM 56, the function encoder 60 uses up to nine locations. The function encoder 60 generates the starting address of the encoded word message as output signals from the NOR gates 180, 182, 184 and 240 on lines 230, 232, 234, and 242 respectively representing the 64, 32, 16 and 8 position of function starting address. These signals are then loaded as inputs on lines 230, 232 and 234 into a four-bit up/-down counter 236 and on line 242 into a four-bit up/-down counter 238 in FIG. 4. Similarly, the signals on output lines 162, 100 and 104 from FIG. 2, respectively representing the 8, 4, and 1 positions of the numeric address, are loaded as inputs on lines 162, 100 and 104 into a four-bit up/down counter 238 in FIG. 4. NOR gate 240 in FIG. 3 also provides a clear enabling signal on line 242 for entry into counter 238.

Figure 5:
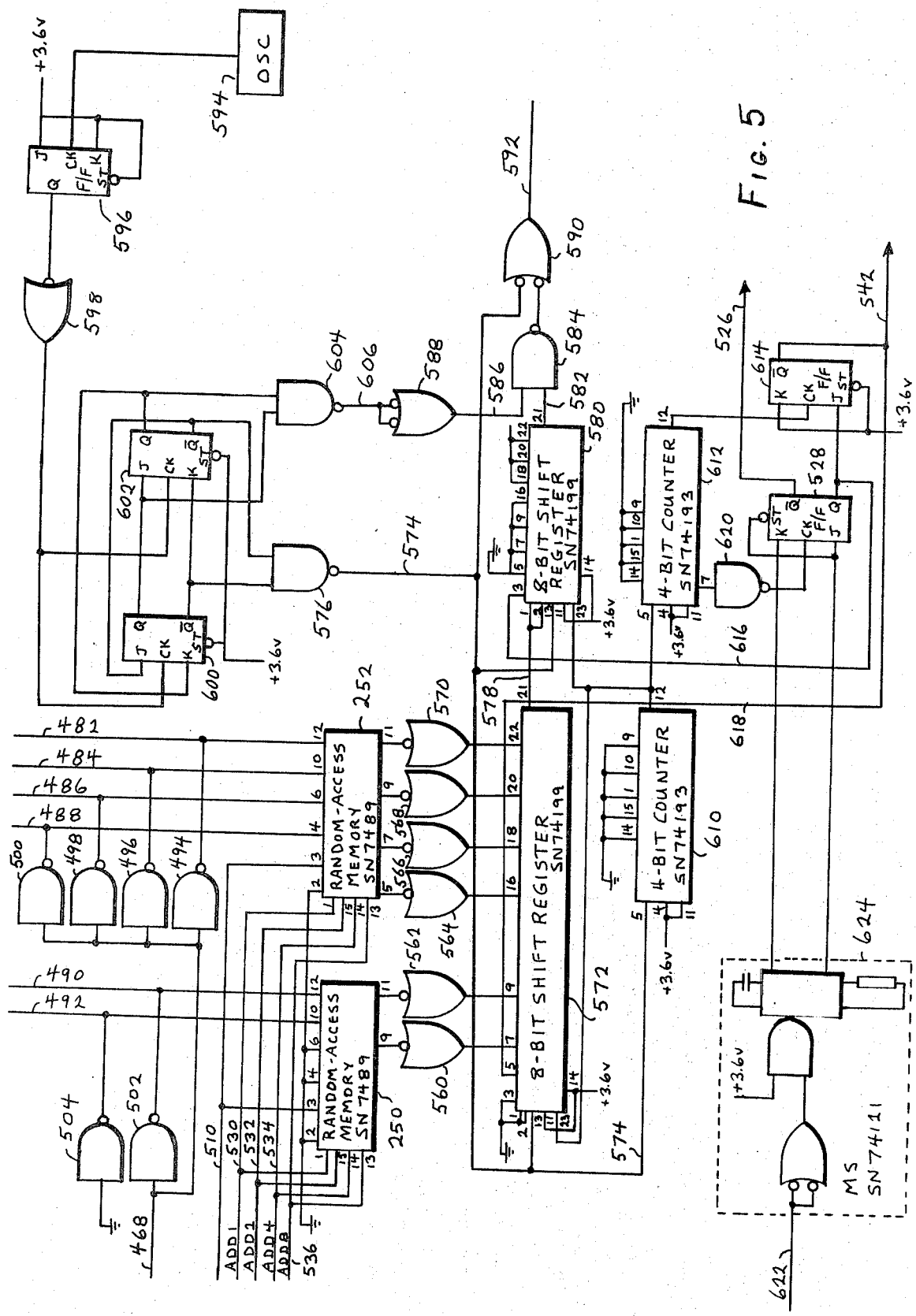
FIG. 5 illustrates the random-access memory, the parallel-to-serial converter, and certain control logic associated therewith.
Figure 6:
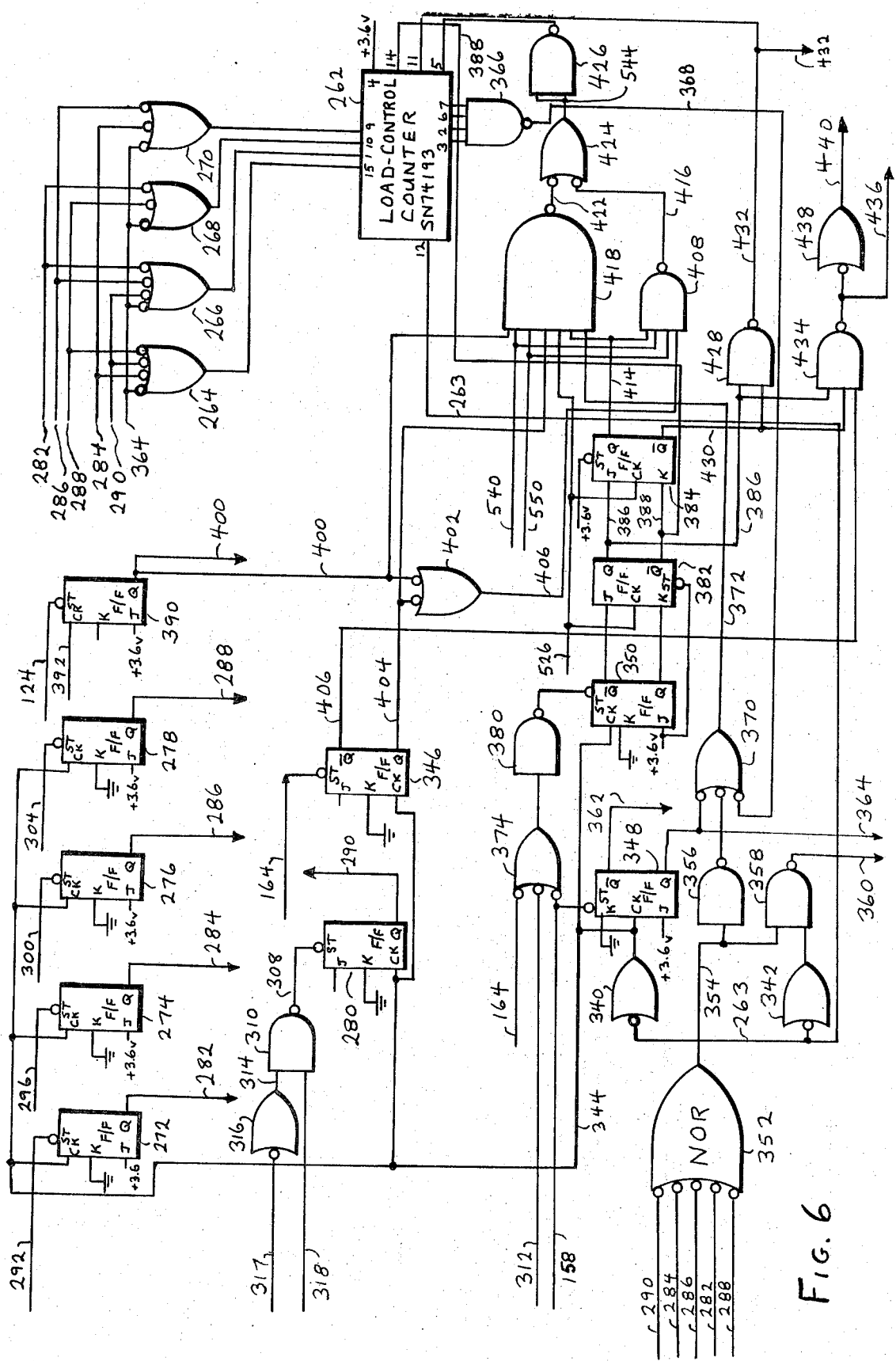
FIG. 6 illustrates certain control logic for use in connection with the memory units.

In FIG. 5, random-access memory units 250 and 252, which are parts of overall random-access memory 58, are loaded with successive characters until load control counter 262 in FIG. 6 reaches a full count, at which time the counter provides a carry signal on its output line 263. Load Control counter 262 is previously preset by output signals from flip-flops 282, 286, 288 and 284. The function message length was stored in blackout-and-deadwood flip-flop 272, reset-and-check flip-flop flip-flop 274, spot flip-flop 276, telephone flip-flop 278, ball-return flip-flop 280, and is read out from their respective output lines 282, 284, 286, 288 and 290. The set signal for flip-flop 272 is supplied on a line 292 from a NAND gate 294. (See FIG. 3). The set signal for flip-flop 274 is supplied on a line 296 from a NAND gate 298. The set signal for flip-flop 276 is supplied on a line 300 from a NAND gate 302. The set signal for flip-flop 278 is supplied on a line 304 from a NAND gate 306. The set signal for flip-flop 280 is supplied on a line 308 from a NAND gate 310. The inputs to gate 310 are supplied respectively on line 318 (a function strobe) from NOR gate 220 and on a line 314 from an inverter 316 which has a ball-return signal at its input on line 317. The function strobe is also supplied through the inverting nor gate 220 on a line 318 to one input each of the NAND gates 298, 294, 302 and 306, the other inputs for which are respectively supplied from the outputs of NOR gates 320, 322, 324, and 326. NOR gate 320 receives a reset signal on its input line 328 and a check signal on its input line 330. NOR gate 322 receives a deadwood signal on its input line 332 and a blackout signal on its input line 334. NOR gate 324, connected as an inverter, receives a spot signal on its input line 336. NOR gate 326 receives a telephone signal on its input line 338.

The carry output on line 263 is fanned out and inverted in inverting NOR gates 340 and 342. Output line 344 from inverter 340 is provided as a clock input to clear previously mentioned flip-flops 272, 274, 276, 278 and 280 and to additional flip-flops 346, 348 and 350 to indicate a full count in load-control counter 262.

A NOR gate 352 receives previously identified reset and check flip-flp from line 284, deadwood and blackout flip-flop signal from line 282, spot flip-flop signal from line 286, telephone flip-flop signal from line 288, and a ball-return flip-flop signal from line 290. Gate 352 provides an output signal on line 354 to an inverting NOR gate 356 and to one input of a NAND gate 358. The other input to NAND gate 358 is the inverted carry signal fro load control counter 262 provided by inverter 342, causing gate 358 to provide an end space signal on line 360.

Flip-flop 348 receives its clock pulse from line 344 and receives a numerical strobe signal from line 158 (from two-input NOR gate 152, FIG. 2) as its set signal to provide numeric signals on its output lines 362 and 364.

The high outputs from the four stages of load-control counter 262 are combined in a NAND gate 366 to provide a signal on line 368 which is applied to one input of a NOR gate 370. The other two inputs to NOR gate 370 are provided respectively by the inverted output from gate 356 and by the numeric signal on line 364 to provide an output signal on line 372 from NOR gate 370.

A NOR gate 374 receives the function strobe signal on line 312 (from NAND gate 218 in FIG. 3), the numeric strobe signal on line 158, and a clear signal from line 164 (from FIG. 7), and provides an output signal to an inverting NAND gate 380. The output signal from gate 380 is applied as a clear signal to the load-control flip-flop 350. The output signals from flip-flop 350 are applied directly as inputs to the first (382) of two sync flip-flops 382 and 384. The outputs 386 and 388 from flip-flop 382 are applied directly to the second sync flip-flop 384. The signal on line 388 is also applied to the clear input of counter 262.

A space flip-flop 390 receives a clear space signal on line 392 from a NOR gate 394 (see FIG. 8) as its clock signal and receives a function strobe signal on line 124 (from inverting NOR gate 398, FIG. 3) as its clear signal. The output on line 400 from flip-flop 390 is applied to one input of a NOR gate 402. The other input to gate 402 comes from output 404 of clear flip-flop 346. Clear flip-flop 346 also provides its other output on line 406. NOR gate 402 provides an output on line 406 to one input of a NAND gate 408. Other inputs to gate 408 are provided by input lines 540 and 550 (see FIG. 8) and by output line 414 from the second sync flip-flop 382. Gate 408 provides its output on line 416.

An additional NAND gate 418 receives inputs from lines 400, 410, 412, 404, 372, 414, and from an input line 526 (see FIG. 5) to provide an output on line 422. Lines 526 also provides the clock signals for sync flip-flops 382 and 384. The outputs from NAND gates 408 and 418 on lines 416 and 422 are combined at the input of a NOR gate 424, which provides its output to the input of an inverting NAND gate 426. Inverting NAND gate 426 provides its output to the up-count input terminal of load-count 262.

A NAND gate 428 receives as one input the output signal on line 430 from sync flip-flop 384 and its other signal from line 386. Gate 428 provides its output signal on line 432 to the load input of counter 262. A NAND gate 434 receives as its inputs the signals from lines 386, 430 and 406 to provide a low clear pulse on line 436 and, via inverter 438, a high clear pulse on line 440.

Referring to FIG. 4, the ROM-address seven-bit (total) up/down counters 236 and 238 are loaded with function/numeric addresses on lines 230, 232 and 234 from the function encoder of FIG. 3 and with numeric addresses on lines 104, 162, and 100 and a common function-address signal (address bit 8) on line 242. Under up-count control by an advance-counter signal on line 422 from NAND gate 418 (FIG. 6) and under load control from a load-counter signal on line 432 from NAND gate 428 (FIG. 6), these counters load addresses and provide them to binary-select inputs of read-only memory units 460, 462 and 464 (parts of ROM 56) to control and selected output data from the ROM. Additionally, a NOR gate 466 receives a space signal on line 400 and an end-space signal on line 360 (see FIG. 6) for use in providing a space-character output signal on line 468. Various combinations of function-address signals are provided by inverters 470, 472, 474 and NAND gates 476, 478 and 480 for use in properly addressing the rom for function information. Binary data bits are provided in parallel on output lines 482, 484, 486, 488, 490, and 492, respectively representing the 1, 2, 4, 8, 16 and 32 binary positions of the parallel ROM output data.

Referring to FIG. 5, the parallel data bits on lines 482, 484, 486, 490, and 492 are applied in parallel to the data input terminals of refresh-data random access memory units 250 and 252 to enter the data carried thereon in the memory. Inverters 494, 496, 498, 500 and 502 have their outputs respectively tied to lines 482, 484, 486, 488, and 490 to pull up or pull down the lines depending upon the state of the space-character signal on line 468 at the input to the inverters. These inverters pull down when a space is to be put into memory, and otherwise they pull up. One additional inverter 504 is tied to line 492 and has its input grounded, whereby it always pulls up the line in the absence of a signal thereon.

A load-random-access memory signal on line 510 is derived from a NAND gate 512 in FIG. 8, and is applied to load each character into RAM units 250 and 252.

A digit-position counter 520 is cleared by the clear pulse on line 440 from inverter 438, is loaded initially with ZEROS, and counts up based upon input pulses on line 522 from NAND gate 524 to keep account of the position of the last character in a function. Meanwhile, a refresh-memory address counter 525 is cleared by a reset pulse on line 526 (from a flip-flop 528 in FIG. 5) and keeps track of the position of the refresh cycle, counting the count update signal on line 550 from the display. It provides refresh addresses respectively for bit weights 1, 2, 4, and 8 on lines 530, 532, 534 and 536 for application to address-select inputs of random-access memory units 250 and 252. A comparator 538 compares the outputs from counters 520 and 525 and generates on output on line 540 when address coincidence occurs.

The address coincidence signal on line 540 is applied to one input of NAND gate 524. A second input for display clear is applied on line 542 from FIG. 5. A third output, called load new character, is derived from line 544 (from NOR gate 424, FIG. 6). The fourth input is derived from line 546 at the output of NOR gate 548. Gate 548 receives a count update signal from line 550 as inverted by NAND gate 552 and derived from the character display unit of FIG. 13. The output on line 522 from NAND gate 524 is also inverted by NOR gate 394 to provide the clear space signal on line 392. Line 522 also provides one input to a NOR gate 554, the other input to which is the low clear signal from flip-flop 346 on line 404. The output from gate 554 is applied, with the display clear signal from line 542, to the inputs of NAND gate 512 to generate the random-access memory signal on line 510.

Referring again to FIG. 5, the outputs from the random-access memory units 250 and 252 are applied through inverters 560, 562, 564, 566, 568 and 570 to the parallel inputs of an eight-bit shift register 572 which serves as a parallel-to-serial data converter. The data is shifted out in series under control of a shift-clock signal on line 574 from NAND gate 576. The data passes over line 578 to a second eight-bit shift register 580, which places header information on the serial data before it is shifted out on line 582 to provide one input to a NAND gate 584. The other input to gate 584 is a clock signal to encode the data for serial transmission and is provided on line 586 from an inverting NOR gate 588. NOR gate 590 receives the data output from gate 584 at one input and the sync clock signal from line 574 at the other input to provide a serial data output on line 592.

The system timing is provided by an oscillator 594 clocking a flip-flop 596 to provide a clock signal through an inverting NOR gate 598 to the clock terminals of flip-flops 600 and 602. NAND gates 576 and 604 decode, insofar as is necessary for timing purposes, the outputs of flip-flops 600 and 602 to provide respectively the output on line 574 and an output on line 606 to the inverter 588. Four-bit up/down counters 610 and 612 control the contents of the seventh and eighth bit positions of shift registers 572 and 580 by clocking flip-flops 528 and 614 to provide data on lines 616 and 618 for application to shift register inputs. An inverter 620 is used to couple the clocking signal from counter 612 to flip-flop 528. The JK inputs are controlled by application of an add control signal from line 622 (from counter 525, FIG. 8) through monostable multivibrator 624 to the JK inputs of flip-flop 528.

Briefly referring to FIG. 7, the clear switch 86 provides a signal to a monostable multivibrator 628 to provide the output clear pulse on line 164.

Referring to FIG. 9, a number strobe from line 158 (FIG. 2) and a function strobe from line 312 (FIG. 3) are combined in a NOR gate 632, the output of which is inverted in a NAND gate 634 and applied to one input of a flip-flop 636. The clear signal on line 164 (FIG. 7) is applied to the other flip-flop input. The output on line 638 is applied to a series of inverters 640, 642, 644, 646, and 648 to provide an output on line 650. The output of inverter 640 on line 652 is used to activate a bell to signal a message.

FIGS. 10, 11, 12 and 13 represent equipment located at a remote display or, with a few modifications, at the local display. FIG. 10 illustrates the system used for transferring serial data from the previous remote display to the next display. Line 660 may be connected to receive serial data of the sort which is transmitted by line 592 in FIG. 5. Line 660 provides an input to a transmitter smplifier 662 for inverted serial data output on line 664. The output of inverter 662 is also applied to a transmitting amplifier 666 for generation of data on line 668 for transmission to the next remote display down the line.

FIG. 11 illustrates the system used to send acknowledge signals generated at remote positions back to the main console to clear the characters stored in memory. A balanced clear signal from the next more-remote display is received on lines 670 and 672 and is applied to receiver differential amplifier 674. The transmitters and receivers used may be of the type sold in the National catalog as types DM 8830 and DM 8820. The output of receiver 674 is applied to an inverter and is applied past pull-up resistor 678 to one input of a NOR gate 680. The output on line 682 from the acknowledge switch at the local remote station is applied past another pull-up resistor 684 to the other input of NOR gate 680. The output of NOR gate 680 is inverted by inverter 682 and the inverted output is transmitted by transmitter 684 on line 686 to the next remote display unit or to the main console. Alternatively, if this display is being used as the main display, the signal from NOR gate 680 is inverted in an inverter 688 and applied to a line 690 for use at the main console without the necessity of a transmitter.

Figure 12:
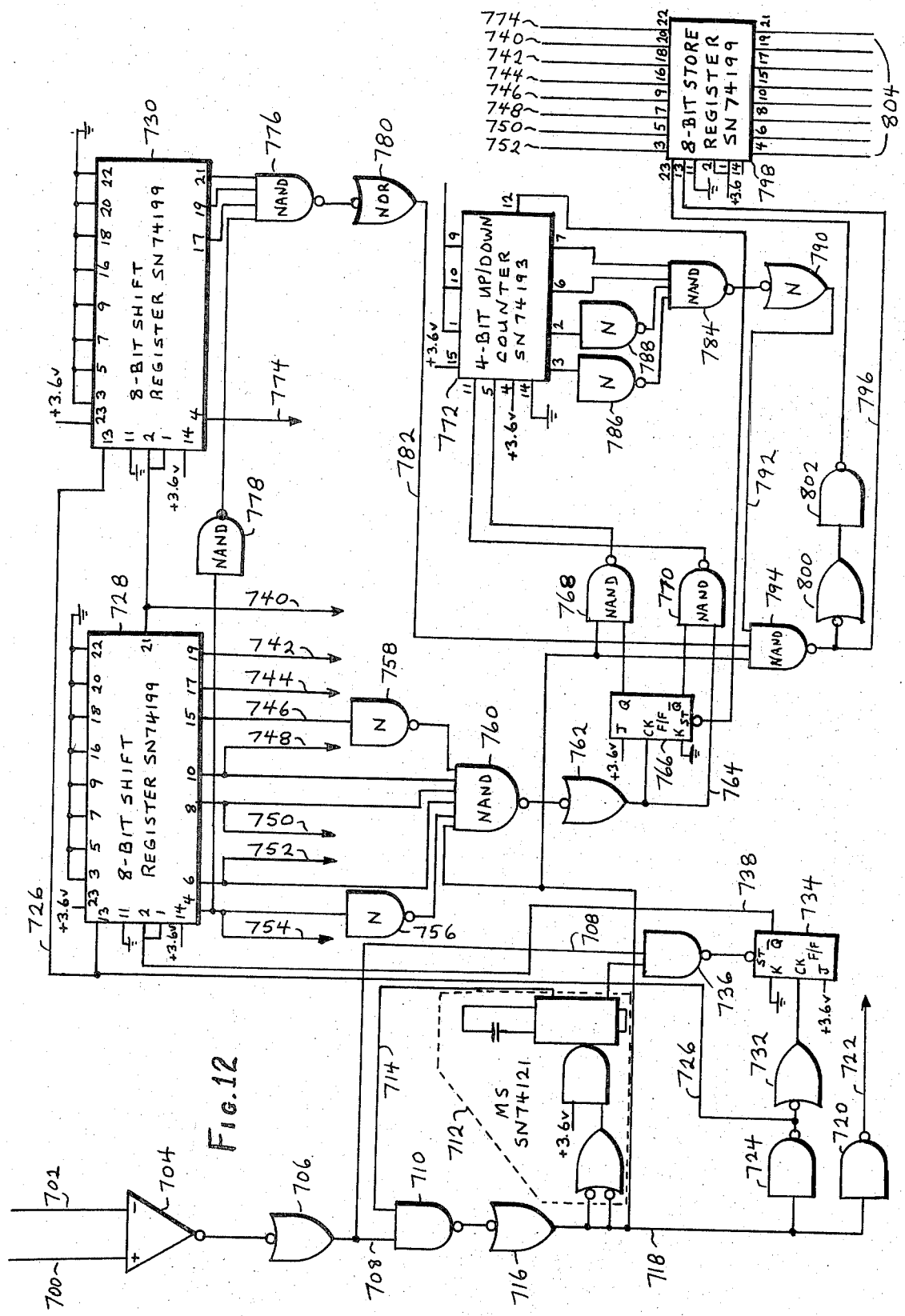
FIG. 12 illustrates a display control, including a serial-to-parallel converter.

Referring to FIG. 12, the balanced data-and-clock signal from lines 668 and 664 of the previous remote display or from coaxial line 66 is received on lines 700 and 702 and is applied to line receiver differential amplifier 704, which provides an output to inverter 706, which provides an inverted output on line 708. Line 708 provides one input to a NAND gate 710, the other input for which is provided by feedback from the output of a monostable multivibrator 712 on line 714. The output of NAND gate 710 is inverted by an inverter 716 to provide an inverted signal on line 718 as the input to the multivibrator 712. Thus, the signal on line 718 is a recovered clock signal, and is applied through an inverter 720 to an output line 722. The signal on line 718 is also applied through another inverter 724 to provide on line 726 a clock signal to eight-bit shift registers 728 and 730 for use in providing serial-to-parallel data conversion.

The signal from line 726 is inverted by an inverter 732 to provide a clock input to a data-recovery flip-flop 734. A NAND gate 736 receives the signal from line 708 at one input and the NOT output from monostable multivibrator 712 at the other input to provide an output signal to set flip-flop 734. The resulting output signal from the flip-flop on line 738 is the recovered data in NRZ form. The line 738 signal is applied as serial data to the input of shift register 728. Parallel output data is provided, respectively weighted 1, 2, 4, 8. 16, and 32, on output lines 740, 742, 744, 746, 748 and 750, a clock signal on output 752, and a stop bit on output 754. Inverters 756 and 758 respectively invert the signals from lines 754 and 746 and apply their inverted outputs, together with the signals from lines 752, 750, 748 and the clock signal from line 718, to the inputs of a NAND gate 760.

The output of NAND gate 760 is inverted by an inverting NOR gate 762 and applied to an output line 764. The signal on line 764 is used to clock a flip-flop 766, whose outputs are respectively applied to one input each of NAND gates 768 and 770. The other input of NAND gate 768 is supplied by the recovered clock on lines 718, and the output of the gate is applied to the load input of a four-bit counter 772. The other input of NAND gate 770 is supplied by the signal on line 764, and the output of this gate is applied to the up-count input of counter 772.

The second shift register 730 receives parallel data from the first register 728 and 730 and provides a reset output on line 774. A NAND gate 776 receives the three lowest-order outputs from register 730 and an inverted line 754 signal from an inverter 778 and provides an output through inverter 780 to an output line 782.

A NAND gate 784 receives direct and inverted signals from counter 772 and inverters 786 and 788 to provide an output signal to an inverter 790, which provides an output signal on line 792 to one input of a NAND gate 794. Gate 794 also receives inputs from lines 718 and 782 to provide an output signal on line 796 to a clock input terminal of an eight-bit shift register 798. The signal from line 796 is also provided through successive inverters 800 and 802 to the shift-/load input of register 798.

Register 798 provides a display memory and receives its input data, clock, and reset signals in parallel on lines 774, 740, 742, 744, 746, 748, 750 and 752 from registers 728 and 730. It passes the same data out over parallel lines 804 to the 16-character display 806 of FIG. 13. Display 806 may be a Burroughs Self-Scan 16-Character Display without refresh memory.

Figure 14:
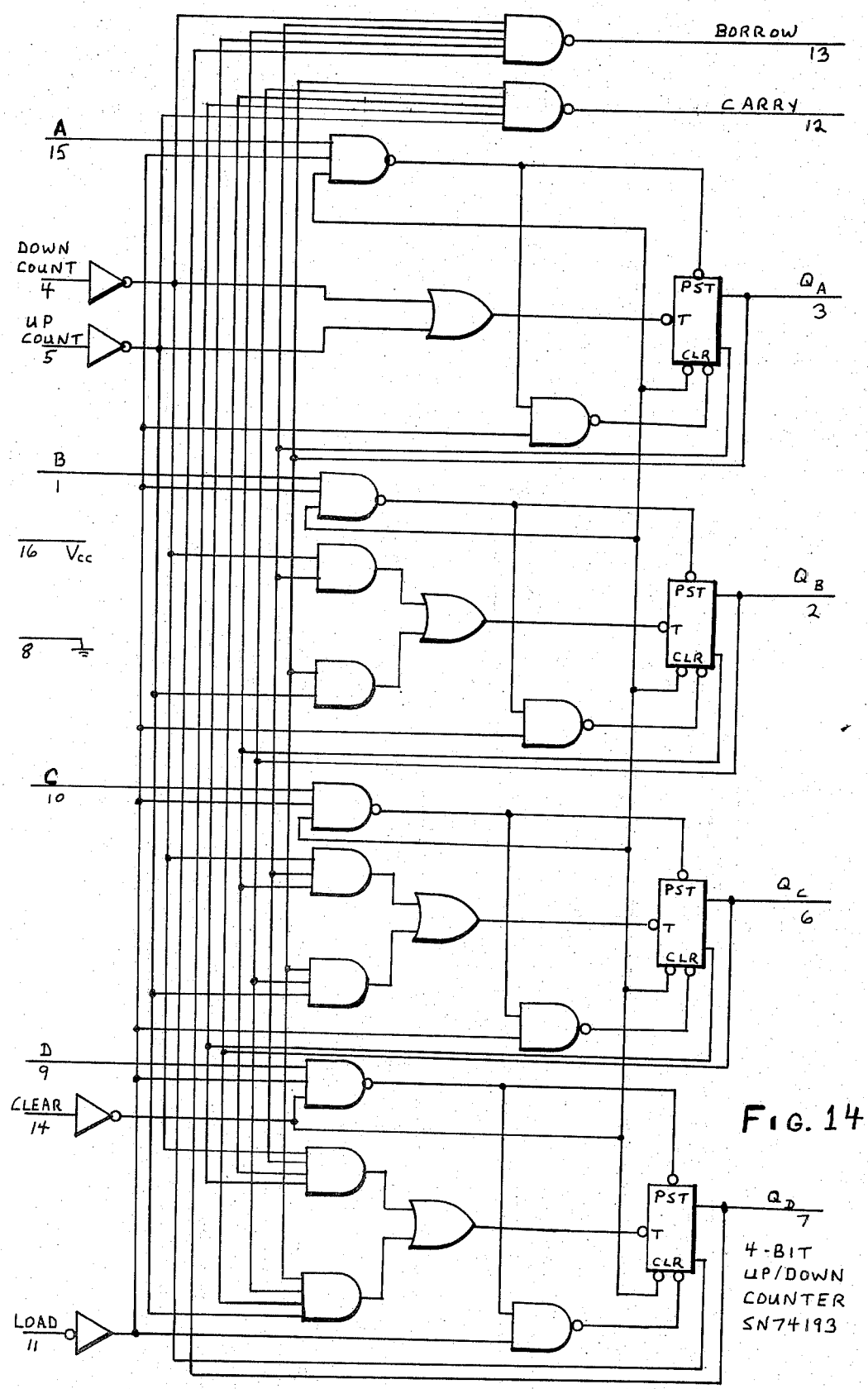
FIGS. 14–18 are respectively diagrams of a four-bit up/down counter SN74193, an eight-bit shift register SN74199, a 256-bit read-only memory SN74188, a 64-bit read-write random-access memory SN7489, and a four-bit magnitude comparator SN7485, all of which are commercially available integrated circuits which can be used in the circuits of the previous diagrams.

FIG. 14 is a diagram showing the construction and numbering of the terminals of a four-bit up/down counter which is commercially available as an integrated circuit SN74193 from Texas Instruments, and which can be fitted into the appropriate blocks in this disclosure.

Figure 15:
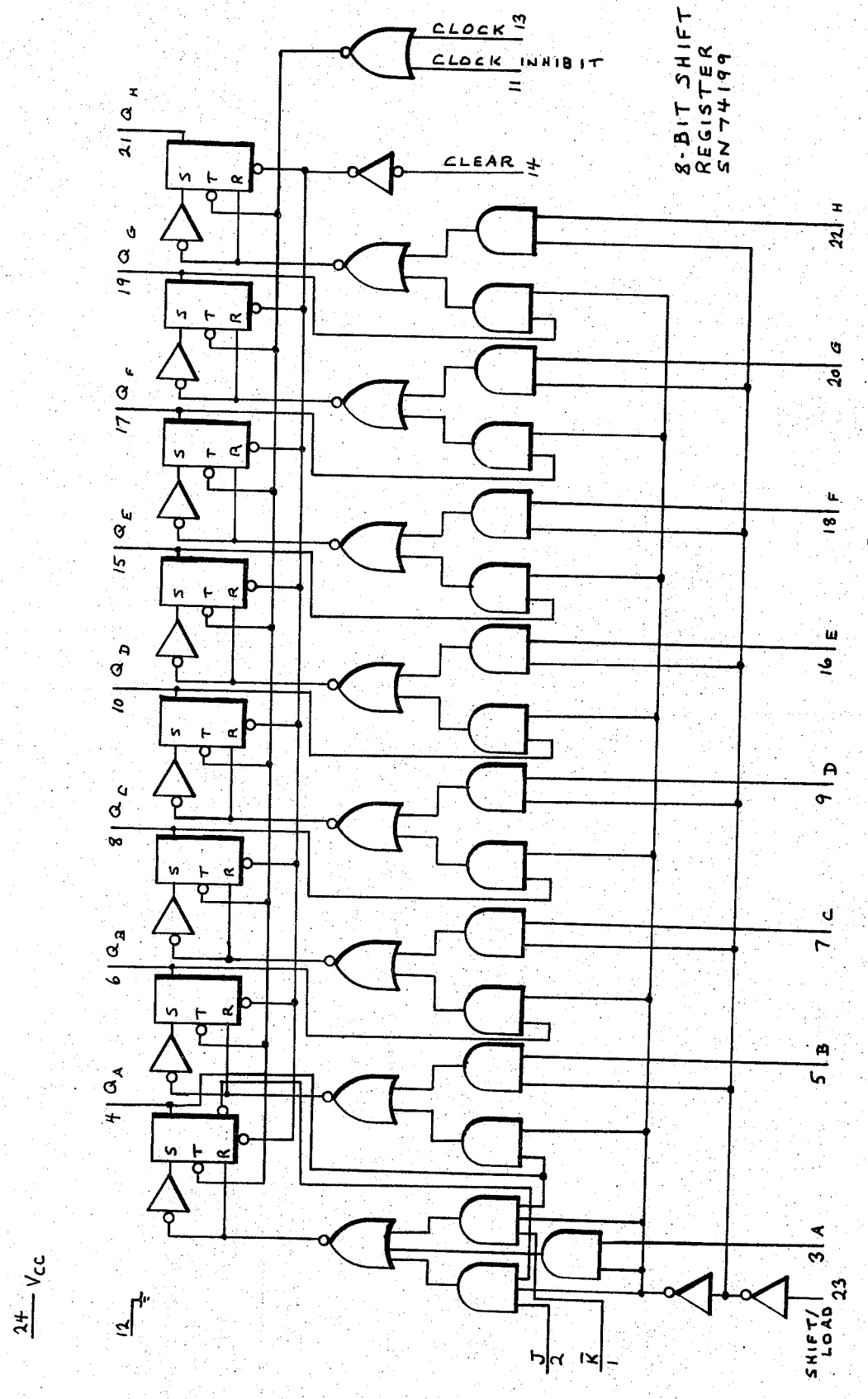

FIG. 15 is a diagram showing the construction and numbering of the terminals of an eight-bit shift register which is commercially available as an integrated circuit SN199 from Texas Instruments, and which can be fitted into the appropriate blocks in this disclosure.

Figure 16:
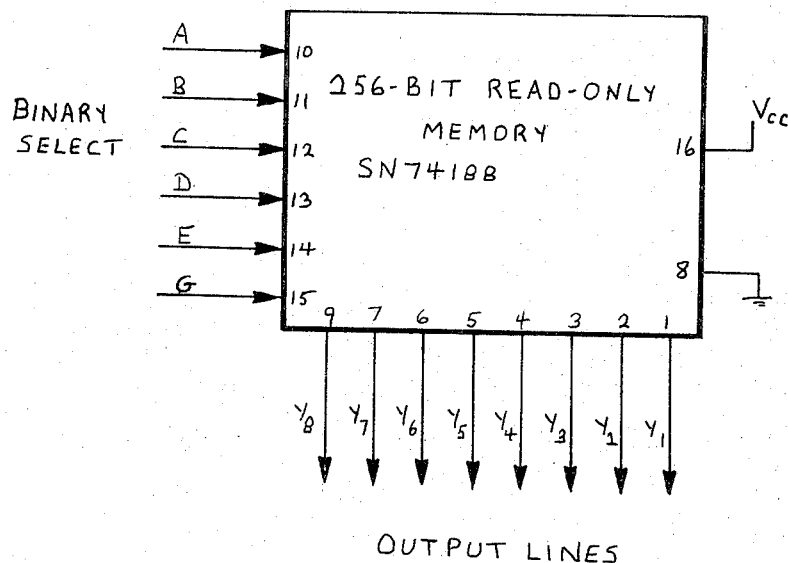

FIG. 16 is a diagram showing the numbering and uses of the terminals of a programmable 256-bit read-only memory which is commercially available as an integrated circuit SN74188, and which can be fitted into the appropriate blocks of this disclosure.

Figure 17:
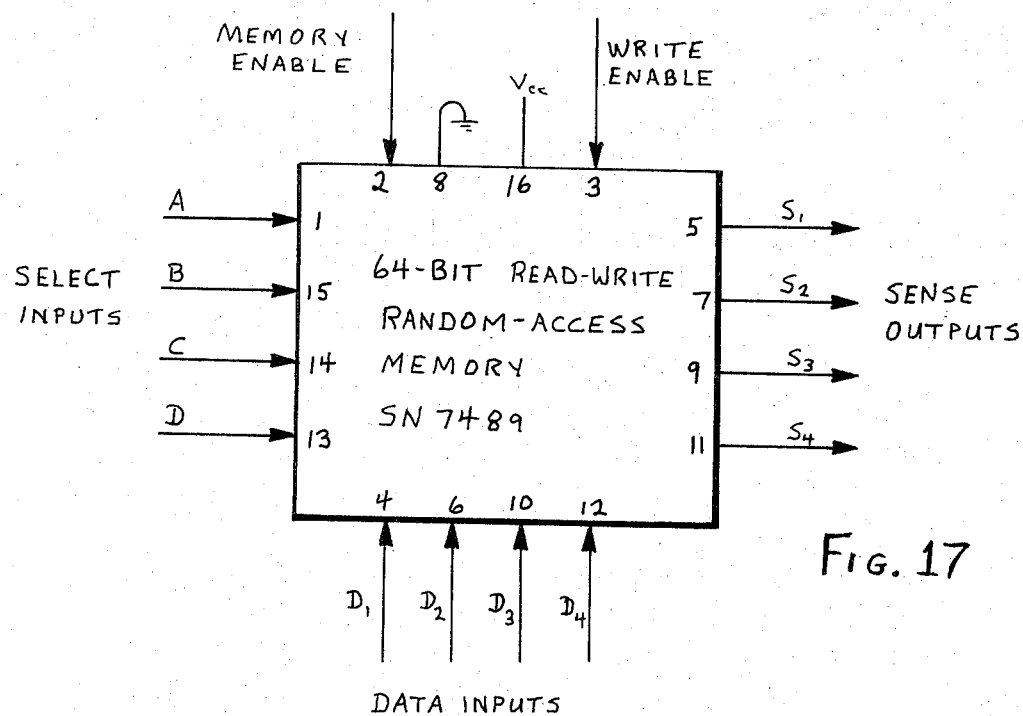

FIG. 17 is a diagram showing the numbering and uses of the terminals of a 64-bit random access memory which is commercially available as an integrated circuit SN7489, and which can be fitted into the appropriate blocks of this disclosure.

Figure 18:
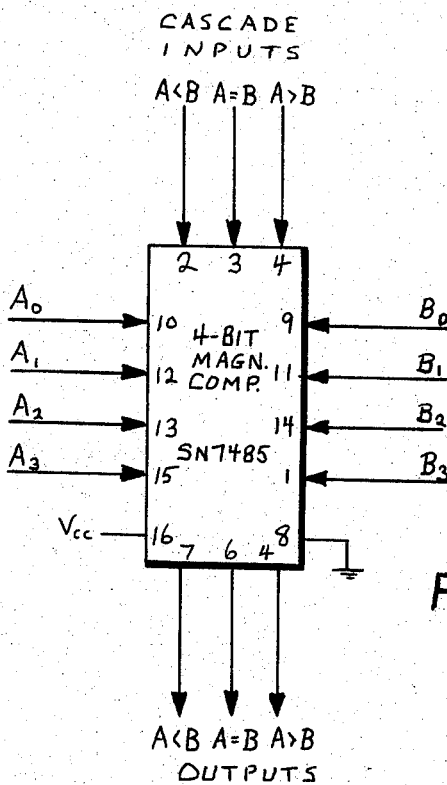

FIG. 18 is a diagram showing the numbering and uses of the terminals of a four-bit magnitude comparator which is commercially available as an integrated circuit SN7485, and which can be fitted into the appropriate block of this disclosure.

We claim:

1. A mechanic call system for use in connection with bowling lanes, comprising:
   A. a read-only memory for storing predetermined multicharacter word functions
   B. a temporary memory for temporarily storing individual multicharacter word functions taken from the read-only memory
   C. a plurality of pushbuttons, including encoder means for causing any one of the pushbuttons, when pushed, to cause the read-only memory to deliver an individual multicharacter word function for temporary storage in the temporary memory,
   D. means for causing the temporarily stored word function to be applied as serial data to a transmission line,
   E. means at a remote location for causing the serial data to be taken from the transmission line and displayed, and
   F. means for generating an acknowledge signal at the remote location and for transmitting said signal back over the transmission line, and G. means at the location of the temporary memory responsive the acknowledge signal for clearing the temporary memory.

2. A mechanic call system for use in connection with bowling lanes comprising:
   A. a numeric keyboard for entering numeric data one number at a time,
   B. a numeric encoder for encoding the numeric data,
   C. a plurality of word pushbuttons for each entering a respective entire multicharacter word function when one button is pushed,
   D. a function encoder for encoding the word functions
   E. a read-only memory addressed by the encoded numeric data and the encoded word functions for reading out multicharacter data corresponding to the encoded data and functions used to address the read-only memory,
   F. a temporary memory for storing
   the multicharacter data and for periodically transferring out the stored multi-character data,
   G. a parallel-to-serial converter for receiving the transferred data in parallel from the temporary memory and for converting it to serial data,
   H. a transmission line,
   I. a serial-to-parallel converter for receiving the serial data via the transmission line for providing parallel data at a first remote display location,
   J. display means for displaying the parallel data at the first remote display location,
   K. means for generating an acknowledge signal at the first remote location and for transmitting said signal back over the transmission line, and
   L. means at the location of the temporary memory responsive to the acknowledge signal for clearing the temporary memory.

3. A system according to claim 2, further comprising:
   A. receiver means for receiving the serial data from the transmission line and providing the serial data to the serial-to-parallel converter,
   B. second receiver means at a second remote display location,
   C. transmitter means at the first remote display location for transmitting the serial data via a second transmission line to the second receiver means,
   D. further serial-to-parallel converter means and display means at the second remote display location for providing a further display of the parallel data, and
   E. means for transmitting an acknowledge signal back from the second remote display location through the first remote display location to clear the temporary memory.

4. A system according to claim 3, further comprising:
   A. A local display, in the vicinity of the keyboard and pushbuttons, and
   B. a clear switch associated with the display for clearing the temporary memory.

5. A call system, comprising:
   A. a read-only memory for storing predetermined multicharacter word functions
   B. a temporary memory for temporarily storing individual multicharacter word functions taken from the read-only memory C. a plurality of pushbuttons, including encoder means for causing any one of the pushbuttons, when pushed, to cause the read-only memory to deliver an individual multicharacter word function for temporary storage in the temporary memory D. means for causing the temporarily stored word function to be applied as serial data to a transmisson link E. means at a remote location for causing the serial data to be taken from the transmission link and displayed, and F. means for generating an acknowledge signal at the remote location and for transmitting said signal back over the transmission line, and G. means at the location of the temporary memory responsive the acknowledge signal for clearing the temporary memory.

6. A mechanic call system for use in connection with bowling lanes for communication between a local location and at least one remote location, comprising:

A. a read-only memory at the local location for storing predetermined multicharacter word functions, B. a temporary memory at the local location for temporarily storing individual multicharacter word functions taken from the read-only memory, C. a plurality of pushbuttons at the local location, including encoder means for causing any one of the pushbuttons, when pushed, to cause the read-only memory to deliver an individual multi-character word function for temporary storage in the temporary memory, D. a two-way transmission link between the local location and the at least one remote location, E. means for causing the temporarily stored word function to be applied as serial data to the transmission link, F. means at said at least one remote location for causing the serial data to be taken from the transmission line and displayed, G. means for generating and acknowledge signal at least one remote location and for applying said signal to the two-way transmission link for transmission in a direction opposite to that of the serial data, and H. means at the local location responsive to the acknowledge signal for clearing the temporary memory.

* * * * *